United States Patent
Tran et al.

(10) Patent No.: US 9,602,279 B1
(45) Date of Patent: Mar. 21, 2017

(54) CONFIGURING DEVICES FOR USE ON A NETWORK USING A FAST PACKET EXCHANGE WITH AUTHENTICATION

(71) Applicant: Amazon Technologies, Inc., Seattle, WA (US)

(72) Inventors: Binh Quoc Tran, Los Altos, CA (US); Michael Abhishek Louis Sanath Kumar, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 100 days.

(21) Appl. No.: 14/735,069

(22) Filed: Jun. 9, 2015

(51) Int. Cl.
| | | |
|---|---|---|
| *H04L 9/32* | (2006.01) | |
| *H04L 9/00* | (2006.01) | |
| *H04L 9/14* | (2006.01) | |
| *H04W 12/08* | (2009.01) | |
| *H04W 12/04* | (2009.01) | |
| *H04L 29/06* | (2006.01) | |
| *H04L 29/08* | (2006.01) | |

(52) U.S. Cl.
CPC .............. *H04L 9/14* (2013.01); *H04L 63/061* (2013.01); *H04L 67/303* (2013.01); *H04W 12/04* (2013.01); *H04W 12/08* (2013.01); *H04L 2209/24* (2013.01)

(58) Field of Classification Search
CPC ....... H04L 9/14; H04L 9/0869; H04L 63/061; H04L 67/303; H04L 2209/24
USPC ........................................................ 713/171
See application file for complete search history.

(56) References Cited

U.S. PATENT DOCUMENTS

| 8,014,526 | B2* | 9/2011 | Billhartz | H04L 63/0435 380/262 |
|---|---|---|---|---|
| 8,051,297 | B2* | 11/2011 | Machani | H04L 9/0822 713/185 |
| 8,117,651 | B2 | 2/2012 | Novotney et al. | |
| 8,990,888 | B2* | 3/2015 | Busser | G06F 21/31 380/44 |
| 2007/0005974 | A1* | 1/2007 | Kudou | G06F 21/606 713/171 |
| 2009/0054036 | A1* | 2/2009 | Chen | H04L 9/0833 455/411 |
| 2012/0280783 | A1* | 11/2012 | Gerhardt | G07C 9/00309 340/5.6 |
| 2015/0019862 | A1* | 1/2015 | Uczekaj | H04L 67/12 713/155 |

* cited by examiner

*Primary Examiner* — Dede Zecher
*Assistant Examiner* — Abdullah Almamun
(74) *Attorney, Agent, or Firm* — Davis Wright Tremaine LLP

(57) ABSTRACT

Aspects of this disclosure related to a computer-implemented method for using a first device to configure a second device to access a network. The method includes transmitting a request on a channel, the request containing information sufficient to inform a device that the system can configure the device to access a network through an access point. The method further includes receiving a response on the channel, the response sent by the device after the request and transmitting a request for security information from a server. The method further includes receiving security information from the server, using the security information to verify an identity of the device, and transmitting a security profile to the device, the security profile containing information sufficient to allow the device to connect to the access point to access the network.

20 Claims, 7 Drawing Sheets

CONFIGURING DEVICES FOR USE ON A NETWORK USING A FAST PACKET EXCHANGE WITH AUTHENTICATION

BACKGROUND

It may be desirable for a large number of devices to be connected to a network such as the Internet with minimal effort. For example, the "Internet of Things" paradigm might refer to having many simple electronic devices that can connect to a local wireless or wired network, in turn connecting those simple electronic devices to the Internet, providing various benefits. However, it may be a significant amount of work to individually connect each of these devices to the network. For example, in a typical wireless network association and connection, a user must select an appropriate network, insert a password for that network, and so on. This may be especially time-consuming or difficult when there are many devices to connect to the Internet, and when those devices offer only a simplified interface, or no interface at all. Additionally, as more and more devices are network-enabled, it might become an expectation that simple devices connect to the network quickly, perhaps more quickly than is allowed for more complex devices that would be accorded some time period in which to handshake, authenticate, and fully connect to the network. Accordingly, it may be desired to have systems and methods to allow for devices to connect to a network and to the Internet with greater ease, faster, and with less user interaction required, while still be able to connect using a secure wireless network and without security risks.

BRIEF DESCRIPTION OF THE DRAWINGS

Various embodiments in accordance with the present disclosure will be described with reference to the drawings, in which.

DETAILED DESCRIPTION

Figure 1:
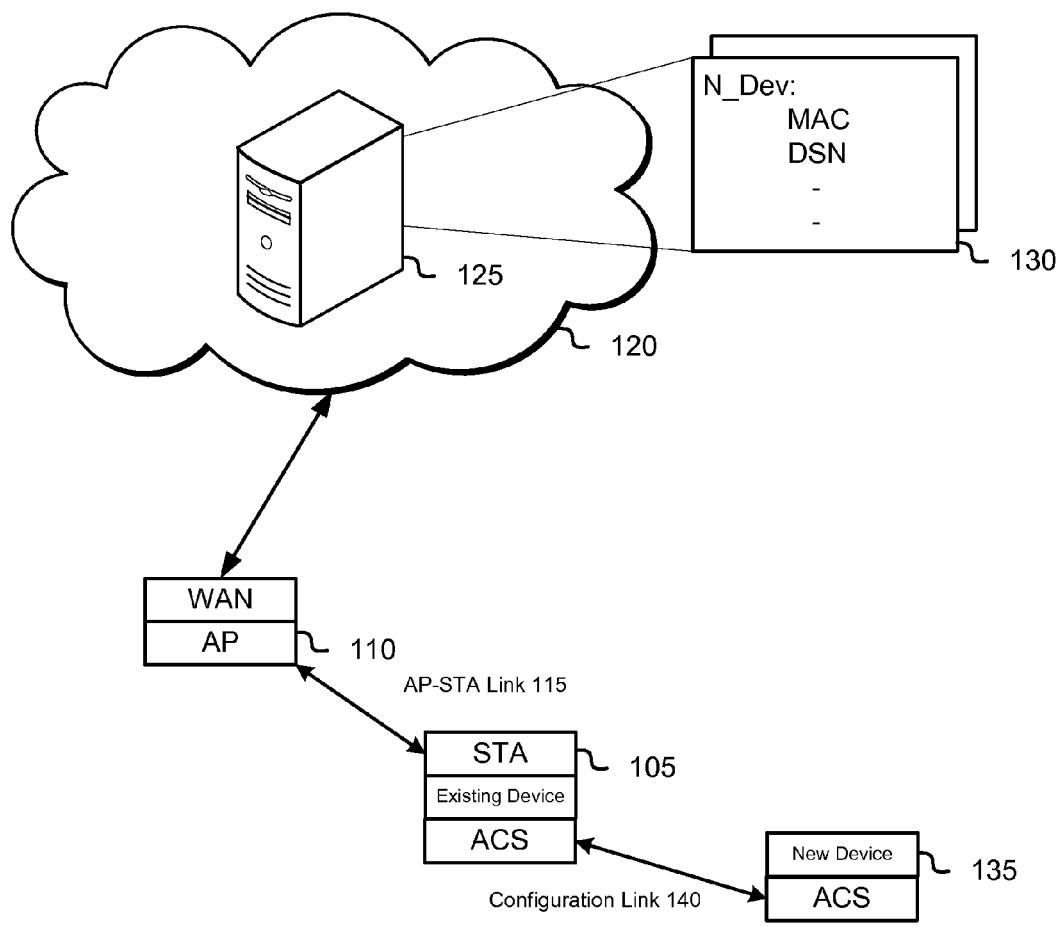
FIG. 1 is an illustration of an exemplary topology of a network, according to some aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for configuring a device to access a network with a reduced amount of user interaction during the process and a reduced amount of lag time. For example, such techniques may be useful for allowing an unprovisioned device to quickly access a wireless communication network with a minimal amount of input from a user, and while maintaining high levels of security for the wireless communication network.

A provisioned device on a network may be configured to transmit a request on a channel. The provisioned device might comprise a transmitter, a receiver, and a processor that is programmed to process data received by the receiver and process and initiate sending data using the transmitter. This request may contain information that would inform an unprovisioned device that the provisioned device can configure the unprovisioned device to access a wireless communication network. In some aspects, this wireless communication network may offer access to the Internet. Upon receiving such a request, an unprovisioned device may be configured to transmit a response to the request. The response may indicate which request it is being prepared in response to. The response may further include certain encrypted information. For example, the response may include an encrypted message (a challenge text). This message may be encrypted based, at least in part, on a secret key or secret value that is known to the unprovisioned device and that is also known to a server. For example, this server may be maintained by a particular vendor, and may contain a number of secret keys, each of which might be associated with one or more possible devices. For example, these secret keys may be assigned to various devices based upon an identifier of the devices, such as a medium access control address of the devices.

The provisioned device may be configured to then request the secret key from a server. For example, the provisioned device may transmit the media access control address (MAC address) of the unprovisioned device to the server, and may receive from the server the secret key associated with that unprovisioned device. This process may allow the provisioned device to authenticate the unprovisioned device, as unauthorized devices may not have an associated secret key, or may not know the secret key.

The provisioned device may then transmit information on the wireless network, such as a security profile, to the unprovisioned device. This information may be encrypted, based at least in part on the received secret key. In order to allow the unprovisioned device to authenticate the provisioned device, the provisioned device may also decrypt the challenge text, based at least in part on the secret key. The provisioned device may then encrypt the challenge text, using a different encryption but also based at least in part on the secret key. For example, the challenge text may have been originally encrypted using a sequence number, the MAC address of the unprovisioned device, and the secret key. The provisioned device may be configure to encrypt the challenge text using the sequence number, the MAC address of the unprovisioned device and the provisioned device, and the secret key. This information may then be transmitted to the unprovisioned device. The MAC address of the unprovisioned device is typically used by the device for other network interactions, besides the interactions described herein.

The unprovisioned device may be configured to authenticate the provisioned device, by verifying that the challenge text has been correctly decrypted and re-encrypted, by decrypting the received encrypted challenge text. Upon this confirmation, the unprovisioned device may receive the information about the network, and may use this information to connect to the network. It may be observed that this process may require little-to-no user intervention in order to allow an unprovisioned device to connect to the network. It may also be observed that both the unprovisioned device and the provisioned device are able to authenticate the identity of the other. Further, it may be observed that information on the network, such as sensitive login information for a wireless network, is encrypted when it is transmitted. Accordingly, the process may help to ensure the security of the network itself.

In some aspects, it may be advantageous for a number of devices to be connected to the Internet. For example, household devices may be connected to the internet as a part of the Internet of Things (IOT), which may bring a slew of devices that will need connectivity to the Internet. Generally, the IOT is a network of physical objects or "things" embedded with electronics, software, sensors and connectivity to enable those objects to achieve greater value and service by exchanging data with the manufacturer, operator and/or other connected devices. Each object on the network may be uniquely identifiable through its embedded computing system but may be able to interoperate within the existing Internet infrastructure. In some aspects, it may be desirable to provide methods and systems for allowing seamless configuration of these devices in order to allow these devices to access the Internet with as few steps as possible. For example, it may be desirable if an unprovisioned device could be added to a network or a home, and if that device may be configured to access the Internet with as little user input and effort as possible.

Accordingly, in some aspects, it may be desired to have a configuration protocol which may provide for relatively easy configuration of unprovisioned devices with the network and/or the Internet generally. For example, this protocol may have a number of different goals and functions. The protocol may be configured to reduce or minimize a number of steps needed to configure an unprovisioned device to access the network. As used here, the network may include a wireless communication network, such as an Institute of Electrical and Electronics Engineers (IEEE) 802.11-compatible network (Wi-Fi), and that local network may allow access to a larger network, such as the Internet. While many of the examples herein refer to Wi-Fi networks, other networks using authentication might be present and used in a similar manner in addition to, or instead of, Wi-Fi networks.

The protocol may also be configured to reduce or minimize an amount of user interaction that might otherwise be needed in order to configure an unprovisioned device to access the network. The protocol may further reduce or minimize an amount of additional congestion to the communication medium, such as the wireless medium in the case of a Wi-Fi network, in order to configure an unprovisioned device. For example, it may be desirable to reduce the number of packets that are exchanged between various devices on the wireless medium in order to configure an unprovisioned device, and to reduce the amount of data that needs to be transmitted across the network during this process. Further, the protocol may provide mutual authentication and data encryption, so that network security may be maintained or enhanced. It may also be beneficial if the protocol provides a flexible and scalable configuration that can be used by a broad range of devices.

In some aspects, a configuration module may be used. This module may operate according to a configuration protocol, which is described in detail below. The configuration protocol may also use a configuration link, which is also described in detail below. While certain aspects of this description may be written to relate to a Wi-Fi network, this configuration technique may be used on other types of network as well. For example, this configuration technique may be used with other communication physical layer (PHY) technologies.

FIG. 1 is an illustration 100 of an exemplary topology of a network, according to some aspects of the present disclosure. As illustrated, a station (STA) 105 may be connected to an access point (AP) 110 via an AP-STA link 115. In some aspects, the STA 105 may be any type of device that can access the wireless network provided by the AP 110. Similarly, the AP 110 may also be any type of device. The AP-STA link 115 may include a wireless communication link, such as a link over a Wi-Fi network via a wireless communications medium. The AP 110 may also provide access to a wide-area network (WAN) 120, such as the Internet. Among other devices that may be accessible on the WAN 120, there may be a server 125 that may hold information 130 about a number of devices. For example, this information 130 may include information such as the Medium Access Control (MAC) address, device serial number (DSN), model number, device name, and other information for each of a number of different devices.

In some aspects, the STA 105 may be a provisioned device on a network. That is, STA 105 is a device that is already connected to the network. For example, STA 105 may be a device that is connected to a Wi-Fi network and has access to the Internet. In some aspects, the STA 105 may be configured to communicate with an unprovisioned device 135 and also to communicate with the server 125. In some aspects, for example, this configuration may take the form of an app that configures STA 105 to communication with unprovisioned device 135 and server 125. The unprovisioned device 135 may be a device that is first attempting to gain access to the wireless communication medium, and may wish to also gain access to the WAN 120 and to establish a communication link with the server 125.

In some aspects, a provisioned device on the network may become an unprovisioned device 135. For example, if network parameters change, such as a change of security keys on the network, a provisioned device on the network may become an unprovisioned device 135, and may behave as an unprovisioned device 135. This may also occur, for example, if a new access point is installed, or is passphrases for a network are changed.

In some aspects, the STA 105 may be configured to establish a configuration link 140 with an unprovisioned device 135. For example, the configuration link may make use of the IEEE 802.11 PHY and MAC address, and may be used to aid in configuring the unprovisioned device 135 to access the WAN 120. This access to the WAN 120 may be provided through the AP 110, such as be establishing a link between the unprovisioned device 135 and the AP 110.

Figure 2:
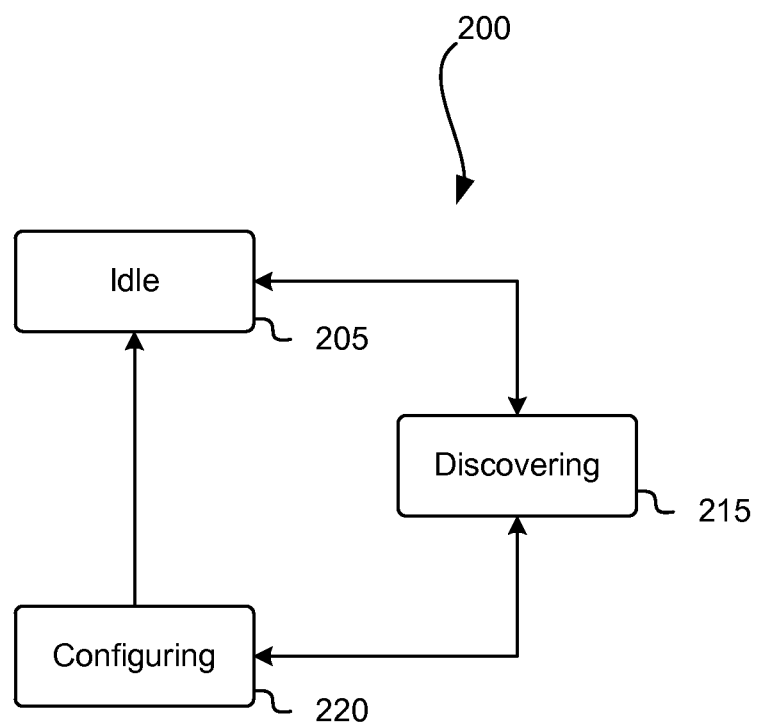
FIG. 2 is an illustration of states of a device that is capable of providing configuration information to other devices.

FIG. 2 is an illustration 200 of states of a provisioned device that is capable of providing configuration information to other devices. For example, these states may be used by the STA 105 illustrated in FIG. 1. In some aspects, each device that uses the configuration techniques described herein may be configured to enter some or all of the states found in the illustration 200.

A provisioned device may be configured to be in an idle state 205 at times. For example, the provisioned device may boot in an idle state 205. After a period of time, the provisioned device may transition from the idle state 205 to enter into a discovering state 215.

Discovering state 215 is a state that the provisioned device may enter into to discover unprovisioned devices that may be operating in a listening state. When entering discovering state, the provisioned device may be configured to send out a probe request on a channel, such as the pre-defined channel described above. The probe request may contain a SSID information element (IE) with the setup value, and may also contain a second IE with a particular value. For example, the second IE may be a vendor-specific information element (IE) with a vendor-specific OUI. The contents of the probe request are described in further detail below.

A provisioned device in discovering state 215 may also be configured to filter probe responses that contain the SSID IE with the setup value, such as "Setup," and that also contain a second IE, such as the vendor-specific IE with the vendor-specific OUI. A provisioned device may be configured to enter configuring state 220 in order to configure unprovisioned devices to access the wireless network.

When a provisioned device that is in discovering state 215 encounters an unprovisioned device that is in listening state 210, the provisioned device may be configured to enter a configuring state 220. For example, the provisioned device may determine that the unprovisioned device is in listening state based upon receiving a probe response that contains a SSID IE with a particular setup value and also contains a second IE.

Configuring state 220 is a state that the provisioned device enters into after discovering an unprovisioned device that it wants to configure, such as based on receiving a particular probe response with particular values. When entering configuring state 220, the provisioned device may be configured to send out a frame on the particular channel that contains certain elements. For example, the frame may be an action frame. The particular channel may be the pre-defined channel described above, such as a social channel. The frame may include the second IE, such as including a vendor-specific IE with a vendor-specific OUI. Other contents of the frame are specified in higher detail below. Accordingly, configuring state 220 is a state in which a provisioned device such as STA 105 in FIG. 1 may enter in order to configure an unprovisioned device, such as unprovisioned device 135 in FIG. 1, in order to configure that device to access a network. For example, this network may be a Wi-Fi network that offers connectivity to the Internet through an AP that provides the Wi-Fi network. After the provisioned device successfully configures another device, the provisioned device may more from the configuring state 220 into the idle state 205.

Figure 3:
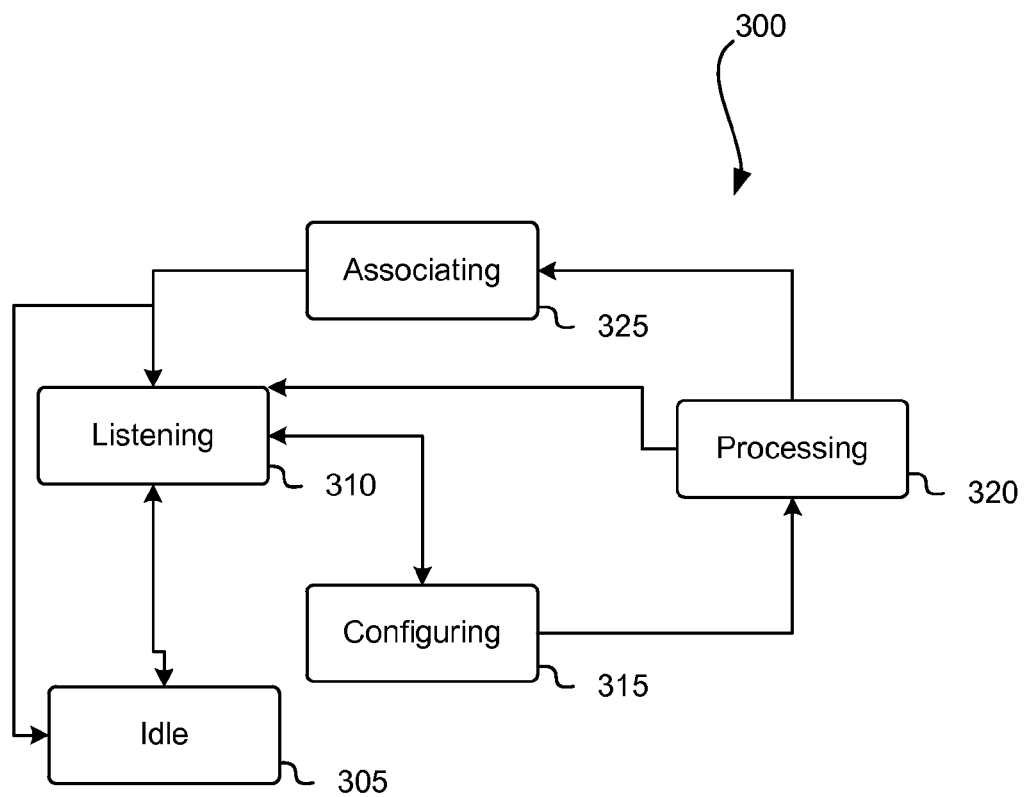
FIG. 3 is an illustration of states of a device that is to be provided configuration information.

FIG. 3 is an illustration 300 of states of an unprovisioned device that is capable of receiving configuration information to other devices. For example, these states may be used by the unprovisioned device 135 in FIG. 1. In some aspects, each device that uses the configuration techniques described herein may be configured to enter some or all of the states found in the illustration 300.

At a particular point in time, an unprovisioned device may be in an idle state 305. For example, an unprovisioned device may boot up into an idle state 305. Generally, if a user initiates a handshake process, an unprovisioned device may transition from the idle state 305 to a listening state 310. Alternatively, this transition may happen when the unprovisioned device determines that it is not associated with a network and needs to be associated with a network. In this situation, the unprovisioned device may be configured to enter a listening state 310. The listening state may be a state that the unprovisioned device enters into when waiting to be discovered by a provisioned device, and that the unprovisioned device uses in order to obtain configuration parameters. For example, unprovisioned devices in the listening state 310 might be waiting to be discovered so that they can obtain configuration parameters from a provisioned device that is already connected to a WLAN. These configuration parameters may include parameters related to how to connect to a WLAN. When entering into the listening state, an unprovisioned device may be configured to go to, and stay on, a particular channel. For example, each device may be configured to have a pre-defined channel. In some aspects, this channel may be described as a social channel, as many different devices may be present on this channel. Using a single channel for this purpose may allow multiple devices to more easily find each other, such that an unprovisioned device may be able to more easily connect to a provisioned device. Accordingly, the use of a single channel may facilitate faster discovery of unprovisioned devices by existing STAs on a network, such as STA 105.

In the listening state 310, an unprovisioned device may be configured to receive a probe request frame that contains a service set identifier (SSID) information element (IE) with a particular value. Such a probe request may be transmitted by a provisioned device on the network, such as STA 105 in FIG. 1. For example, this IE may have a value corresponding to a "Setup" value, or another value that provides an indication that the transmitting device is able to provide configuration information to unprovisioned devices. In some aspects, the value may include a value of "Setup." The probe request may further include a second IE with a particular value. For example, the second IE may be a vendor-specific IE that uniquely identifies the supplier of the particular device being added to the network. Examples of such values are the Organizationally Unique Identifiers (OUIs) that are assigned by the IEEE for use in forming MAC addresses. Where part of the MAC address is an OUI and the other part is assigned by the vendor, individual MAC addresses can be globally unique. Upon receiving such a probe request, a device that is in the listening state 310 may be configured to respond with a probe response. The contents of this probe response are described in more detail below.

Devices may be configured to launch initially into the listening state 310 at manufacture. For example, such a state may be used to allow a device to connect to a network for the first time, and as such, it may be beneficial for an unprovisioned device to be configured to enter such a state initially. In some aspects, it may also be beneficial for a device to enter the listening state 310 at other times. For example, a device may enter the listening state 310 when the device is subject to a factory reset, such as by pushing a factory reset button on the device. A device may also be configured to enter the listening state 310 when the device is put into a certain setting or using a configuration user interface, for devices that offer a user interface to a user. For example, if a device offers a graphical user interface, that graphical user interface may allow a user to put the device into the listening state 310, in order to allow the device to find a wireless network and configure the device to use that network.

When a device in listening state 310 receives an appropriate probe request (such as a probe request with a setup value), the device may transition to configuring state 315. In this state, a device may create and transmit a probe response to the probe request. The contents of the probe response are described in further detail below, with regards to FIG. 4. If, after a period of time after sending the probe response, no action frame is received, the device may transition back to the listening state 310.

If a device transmits a probe response in a configuring state 315 and receives an action frame, the device may enter the processing state 320. In this state, a device may process the action frame. For example, a device may determine whether the action frame is valid. As described in more detail below, this may include authenticating the identity of the provisioned device transmitting the action frame. For example, this may involve decrypting an encrypted portion of the action frame, such as to receive a challenge text. If the action frame is not valid, such as if the provisioned device cannot be authenticated, the unprovisioned device may transition from the processing state 320 to the listening state 310.

If the action frame is valid, the unprovisioned device may transition from the processing state 320 to the associating state 325. In this state, the unprovisioned device may use information contained in the action frame, such as information about a wireless network, to associate with a wireless network. If the unprovisioned device successfully associates with the wireless network, the device may return to an idle state. If the unprovisioned device fails to associate with the wireless network, the unprovisioned device may transition to an idle state 305.

In some aspects, the communications described herein may be transmitted according to a security protocol. For example, this may allow these communications to proceed with a level of security. Some goals of this security may include reducing or minimizing user input in the transmission of configuration parameters, and avoiding having the user input a password, a pass phrase, or a PIN. The security may also be configured to provide mutual authentication between the unprovisioned device, such as unprovisioned device 135 in FIG. 1, and the configuring device, such as STA 105 in FIG. 1. Further, the security used may also provide data encryption between the two devices.

The level of security should be robust enough for the purpose of configuration and setup of the unprovisioned device. The duration and amount of data exchanged between the two devices should be minimal, in order to make it difficult to compromise the encryption used between the two devices.

Figure 4:
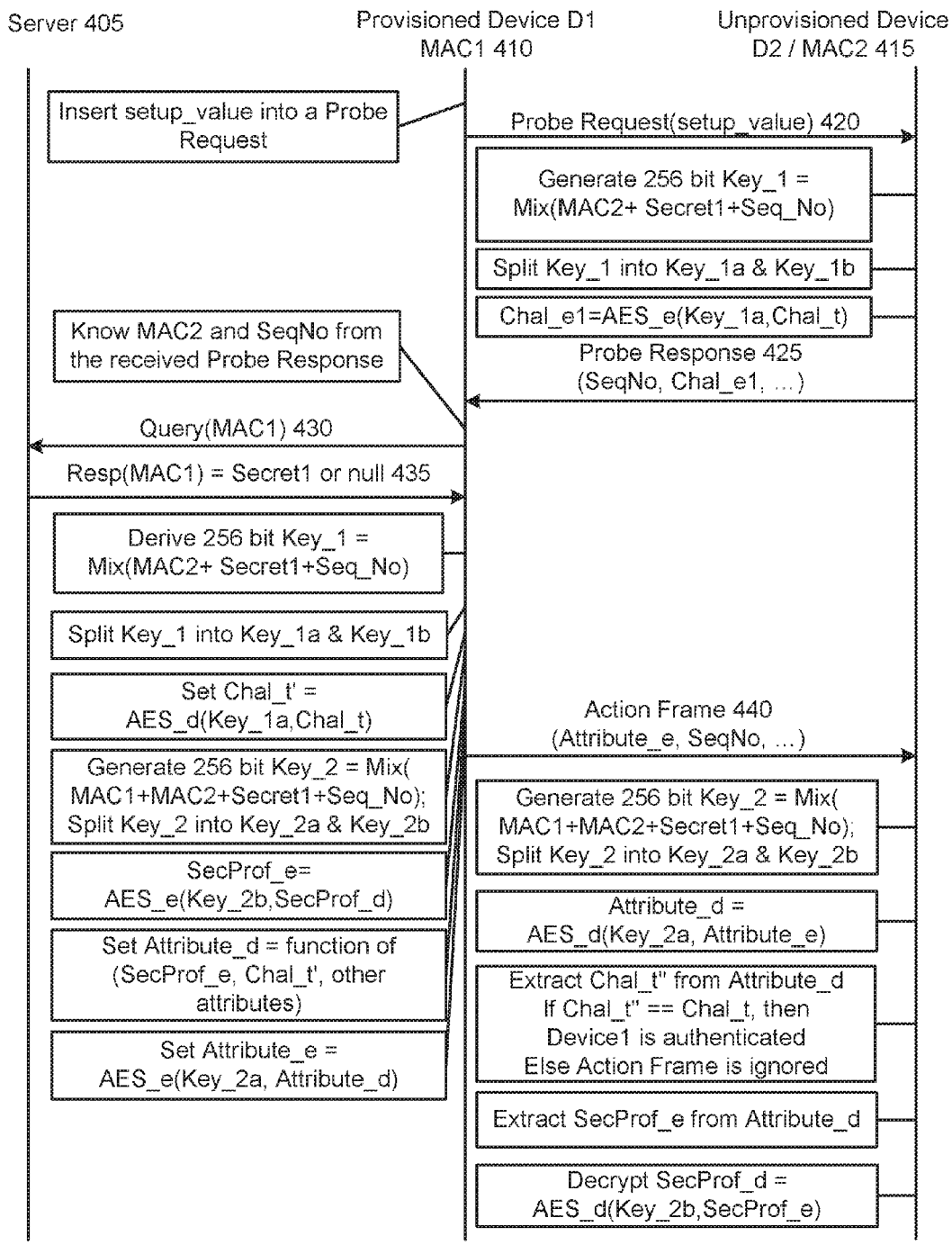
FIG. 4 is an illustration of an exemplary packet flow between three devices according to certain aspects of the present disclosure.

FIG. 4 is an illustration 400 of an exemplary packet flow between three devices according to certain aspects of the present disclosure. Illustration 400 describes an exemplary set of security procedures for mutual authentication that may be taken between a provisioned device D1 410 that is in discovering state 215 (illustrated in FIG. 2) or configuring state 220, and an unprovisioned device D2 415 that is in listening state 210. Further, this process also includes certain security steps taken by the server 405, to which the unprovisioned device D2 415 may wish to gain access.

Mutual authentication may use the transmitter MAC address, a secret (for example, a unique hardware identification (HWID) known only to unprovisioned device D2 415 and server 405, which may be known as Secret1) and an adaptive client suite (ACS) transaction sequence number (Seq_No). This sequence number may be a randomly-generated number by the unprovisioned device D2 415. The sequence number may be used in the encryption, as a seed value, and may also prevent certain security concerns on the network. The seed number may prevent replay attacks, for example. In some aspects, the protocol messaging exchanges may flow through the ACS IE as denoted by an OUI of value A0:02:DC and an OUI sub-type of 1. Additional details about the ACS IE format are described further below.

First, provisioned device D1 410 inserts a setup value into a probe request. For example, this setup value may include an OUI, indicating a manufacturer of a device, and an OUI subtype, indicating the type of probe request that is being transmitted. For example, the OUI may indicate a particular manufacturer, and the OUI subtype may be used to indicate that the probe request is intended to help setup an unprovisioned device to access the network. For example, in some aspects, the OUI value may be A0:02:DC for a particular manufacturer and the OUI subtype value may be 1. The provisioned device D1 410 may transition from an idle state to a listening state prior to composing this probe request.

Next, provisioned device D1 410 transmits a probe request 420, as described above. For example, the probe request 420 may contain certain IEs that identify that the probe request is intended to locate devices that are in the listening state. The probe request may take the form of a message transmitted on a pre-defined channel, such that a device listening to the channel may be able to receive the message on that channel.

In response to the probe request, the unprovisioned device D2 415 will transmit a probe response to the provisioned device D1 410. This probe response may contain an ACS IE. The ACS IE may contain at least a challenge attribute. For example, a 256-bit master key, here denoted Key_1, may be generated by unprovisioned device D2 415 using MAC2 address (the MAC address of unprovisioned device D2 415), the secret (such as Secret1), and Seq_No. In some aspects, Seq_No may be used in order to prevent replay attack of the same message; if a given sequence number is never reused, then the recipient, upon seeing a particular sequence number again, will know that a replay attack is underway and should ignore the message. Used up sequence numbers might be stored at the server and/or at the provisioned device and checking for reuse of sequence numbers can be done at the server and/or at the provisioned device. The unprovisioned device may have a mechanism, such as a stored register, to allow the unprovisioned device to always use a unique sequence number so that it is not reused.

In some aspects, when key is generated based on these values, the key may be split up into two or more smaller keys. For example, when a 256-bit key is generated (such as Key_1), this key may be split up into two 128-bit keys (such as Key_1a and Key_1b).

In a first step, Key_1 and Key_1a and Key_1b may be generated based on the formula:

STEP1: Key_1=Mix(MAC2+Secret1+Seq_No)
=Key_1a+Key_1b where Mix( ) is a function that can be used to generate an encryption key based upon certain pieces of data. Mix( ) might be a hashing function, or any other suitable function that converts its inputs (in this example, MAC2, Secret1, and Seq_No) to an output from which it would be difficult or impossible computationally to derive those inputs knowing on the output of the function. Key_1 may be a 256-bit key, while each of Key_1a and Key_1b may be 128-bit keys. For example, Key_1a may be the first 128 bits of Key_1, while Key_1b may be the last 128 bits of Key_1.

Next, the ACS IE may contain a challenge attribute. The challenge attribute in the ACS IE may contain a random challenge text (Challenge_t) that is encrypted using Advanced Encryption Standard (AES, using the function AES_e, below) and Key_1a, which is derived from STEP1, above.

STEP2: Challenge_e1=AES_e(Key_1a,Challenge_t)

Upon learning the MAC address of unprovisioned device D2 415 via the probe response 425, unprovisioned device D2 415 can be authenticated by querying the server 405. For example, the server 405 may be located in the cloud, such as being accessible over the Internet. After receiving the probe request from unprovisioned device D2 415, provisioned device D1 410 may be configured to transmit a query 430 to server 405. For example, this query 430 may request Secret1 from the server 405.

The server 405 may be configured to respond to the query 430. The response 435 to the query 430 may contain Secret1. Where server 405 is configured with a particular set of participating MAC addresses, if server 405 receives a query for a MAC address that is not a participating MAC address, server 405 might return a response that indicates that the MAC address is not a participating MAC address, in which case Secret1 is not provided to provisioned device D1 410. With this arrangement, it is possible that devices that were not previously participating devices become participating devices, and vice versa, without needing any reconfiguration of provisioned device D1 410.

Accordingly, when MAC2 is a participating MAC address, provisioned device D1 410 may learn Secret1 from server 405. Provisioned device D1 410 may further know Seq_No and MAC2 (the MAC address of unprovisioned device D2 415) based on the probe response from unprovisioned device D2 415. Accordingly, provisioned device D1 410 may be configured to derive a copy of Key_1:

STEP3: Key_1=Mix(MAC2+Secret1+Seq_No)
=Key_1a+Key_1b

Provisioned device D1 410 may then further be configure to decrypt Challenge_e1 using Key_1a derived from STEP3 and may resend this challenge text back to unprovisioned device D2 415. This returned challenge text may later be used to allow unprovisioned device D2 415 to authenticate provisioned device D1 410.

STEP4: Challenge_t'=AES_d(Key_1a,Challenge_e1)

Next, provisioned device D1 410 may be configured to use Secret1, MAC1 (the MAC address of provisioned device D1 410), MAC2 (the MAC address of unprovisioned device D2 415), and Seq_No to generate a key. For example, this key may be a 256-bit key, Key_2. As with Key_1, Key_2 may be split into two smaller keys, such as 128-bit Key_2a and Key_2b.

STEP5: Key_2=Mix(MAC1+MAC2+Secret1+Seq_No)=Key_2a+Key_2b

In some aspects, Key_2b may now be used to encrypt a Security Profile (SecProf_d) of an AP. For example, provisioned device D1 410 may access a wireless network provided by an AP, such as AP 110 in FIG. 1. Generally, a security profile may include a security type and security credentials (without the SSID) of an AP. This may be a part of the ACS attributes.

STEP6: SecProf_e=AES_e(Key_2b,SecProf_d)

Next, Key_2a may be used to encrypt the ACS attributes (to create Attribute_e based on Attribute_d). The ACS attributes may include the challenge, information about the Wi-Fi configuration, and the security profile. Other information may also be included in the ACS attributes.

STEP7: Attribute_e=AES_e(Key_2a,Attribute_d)

This Attribute_e may be transmitted in an action frame from provisioned device D1 410 to unprovisioned device D2 415. Unprovisioned device D2 415 may then authenticate provisioned device D1 410 after generating a copy of Key_2 and extracting the challenge text from the ACS attribute (Attributed).

STEP8: Key_2=Mix(MAC1+MAC2+Secret1+Seq_No)=Key_2a+Key_2b

STEP9: Attribute_d=AES_d(Key_2a,Attribute_e)

STEP10: Extract Challenge_t'' from Attribute_d

Unprovisioned device D2 415 may then be configured to compare Challenge_t'' from STEP10 to Challenge_t. If the two match, then the devices are mutually authenticated. If the devices are authenticated successfully, unprovisioned device D2 415 may be configured to decrypt the security profile (SecProf_d, or in encrypted form, SecProf_e) extracted from Attribute_d (obtained in STEP9) using Key_2b (obtained in STEP8):

STEP11: Extract SecProf_e from Attribute_d

STEP12: SecProf_d=AES_d(Key_2b,SecProf_e)

Unprovisioned device D2 415 may then be configured to use the security profile (SecProf_d) to connect to the wireless communication network.

It may be observed that once unprovisioned device D2 415 and provisioned device D1 410 have authenticated each other, the two devices may know each other's encryption keys. Accordingly, data may now be encrypted and decrypted. Thus, the Wi-Fi credentials can be securely transmitted across the wireless medium between the two devices.

Generally, the ACS IE may be carried by frames of any type. In some aspects, management frames may be used to carry the ACS IE. For example, these IEEE 802.11 management frames may be transmitted over a Wi-Fi network, and may contain the ACS IE.

The adaptive configuration protocol may make use of standardized IEEE 802.11 (or IEEE 802.11 compatible) management frames as specified by a transport layer to carry specific ACS IEs over the wireless medium, such as vendor-specific ACS IEs. The three management frames used in the ACS protocols may include probe request frames, probe response frames, and action frames. Within these management frames, the ACS protocol may be implemented through a specific ACS IE, such as a vendor-specific ACS IE. In some aspects, a vendor-specific ACS IE may include the fields shown in Table 1.

TABLE 1

| Field | Size (Octets) | Value (Hex) | Description |
|---|---|---|---|
| Element ID | 1 | 0xDD | IEEE 802.11 vendor specific usage |
| Length | 1 | Variable | Length of the remaining fields of the IE (in octets) |
| OUI | 3 | A0:02:DC | Exemplary vendor-specific OUI |
| OUI Type | 1 | Variable | Type identifier of the ACS protocol; OUI Type = 1 indicates an adaptive configuration protocol |
| Version | 1 | Variable | Adaptive configuration value (when OUI Type = 1) |
| ACS Sequence | 2 | Variable | ACS transaction sequence identifier number |

TABLE 1-continued

| Field | Size (Octets) | Value (Hex) | Description |
|---|---|---|---|
| No. ACS Attributes | Variable | Variable | One or more ACS attributes might appear in the ACS IE |

The fields, sizes, values, and other information included in Table 1 is merely one example of a possible implementation of the techniques described herein. For example, a vendor-specific ACS IE may include a one-octet Element ID (EID). This EID may have a specific value, such as 0xDD. The vendor-specific ACS IE may further include a one-octet length field, which includes the length of all subsequent fields, expressed in octets. The vendor-specific ACS IE may further include a three-octet OUI field. Certain values of this field may indicate which vendor ACS IE is included. For example, a value of A0:02:DC may indicate a vendor-specific OUI, in the case that the ACS IE is a vendor-specific ACS IE.

The vendor-specific ACS IE may further include a one-octet OUI type field. This field may identify the type of the ACS protocol. For example, the value of 1 (0x01) may be used to indicate that the protocol described herein may be used. The vendor-specific ACS IE may further include a one-octet version field, which may indicate a version of the ACS IE. For example, the value of this field may be 1 (0x01) when the version of the protocol described herein may be used. The vendor-specific ACS IE may further include a two-octet ACS Sequence Number field. As described above, this field may be used to indicate the ACS transaction sequence identifier number. The vendor-specific ACS IE may further include an ACS attributes field. This field may have a variable length, as is needed. This field may include one or more ACS attributes that appear in the ACS IE, as described above.

In some aspects, a number of different OUI values may be used. For example, Table 2 illustrates some of the OUI values that might be used to indicate a vendor-specific ACS IE, in some implementations. For example, each of these values may be used in the OUI field, in order to indicate that the vendor-specific ACS IE is specific to a vendor.

TABLE 2

| Exemplary vendor-specific OUI |
|---|
| 74:75:48 |
| 74:C2:46 |
| A0:02:DC |

Table 3 is an exemplary format for the adaptive configuration attribute. As with the values in Table 1, the various fields, sizes, and values in this format are merely exemplary.

TABLE 3

| Field | Size (Octets) | Value (Hex) | Description |
|---|---|---|---|
| Attribute ID | 1 | Variable | Type identifier of the ACS attribute |
| Length | 2 | Variable | Length of the remaining fields of the attribute (e.g., the attributes body field) |
| Attributes body field | Variable | Variable | Attribute-specific information fields |

The adaptive configuration attribute may include an Attribute ID field, which may be one octet. The Attribute ID field may be used to identify the type of ACS attribute. Table 4 illustrates some specific values that might be used for this attribute.

TABLE 4

| Attribute ID | Description |
|---|---|
| 0 | Challenge |
| 1 | Wi-Fi Configuration |
| 2 | IP/LAN Configuration |
| 3 | WAN Configuration |
| 4 | Reserved for Future Use |

For example, an attribute ID of 0 may be used to indicate that the attribute is a challenge, while an attribute ID of 1 may be used for a Wi-Fi configuration attribute, an attribute ID of 2 may be used for an IP or LAN configuration attribute, and an attribute ID of 3 may be used for a WAN configuration attribute. Other values may be reserved for future use, in order to allow additional values to further expand the number and type of attributes that may be listed.

Referring back to Table 3, a two-octet length field may be included, which may be used to indicate a length, in octets, of the attributes body field. The attributes body field may include a number of different attribute-specific information fields. For example, different fields may be provided depending on the attribute that is identified in the attribute ID field.

TABLE 5

| Field | Size (Octets) | Value (Hex) | Description |
|---|---|---|---|
| Attribute ID | 1 | 0 | Challenge attribute |
| Length | 2 | 33 | Length of payload (length of the remaining fields of the adaptive configuration attribute, in octets) |
| OP Code | 1 | Variable | 0 = Request; 1 = Response |
| Challenge | 32 | Variable | Encrypted challenge |

Table 5 is an exemplary illustration of an adaptive configuration attribute for a challenge. In this illustration, the attribute ID is 0, which indicates that the attribute is a challenge. Here, the two-octet length field has a value of 33, which indicates that the payload of the remainder of the attribute is 33 octets after the length field. This length includes one octet for an operation identifier (OP Code) field, which may have a value of 0 for a request, and 1 for a response. This length also includes 32 octets for the challenge field, which may include the encrypted challenge.

TABLE 6

| Field | Size (Octets) | Value (Hex) | Description |
|---|---|---|---|
| Attribute ID | 1 | 1 | Wi-Fi Configuration attribute |
| Length | 2 | Variable | Length of payload (length of the remaining fields of the configuration attribute, in octets) |
| OP Code | 1 | 0-2 | 0 = Set; 1 = Get; 2 = Response |
| SSID Length | 1 | 1-32 | Length of SSID (1-32) |
| SSID Value | Variable | Variable | SSID value |
| Security Type | 1 | Variable | Security Type used by the ESS (e.g., 0 = no security; 1 = WEP; 2 = WPA/2-Personal; 3 = WPA/2-Enterprise; 4-255 = Reserved) |

TABLE 6-continued

| Field | Size (Octets) | Value (Hex) | Description |
|---|---|---|---|
| Security Credential | Variable | Variable | The length and format of this field is dependent on the Security Type; this field can be omitted for Security Type = 0 |

Table 6 illustrates is an exemplary Wi-Fi configuration attribute and its underlying structure. This attribute may include an attribute ID with one-octet, with a value of 1. As described in Table 4, the value of 1 may indicate that the attribute described in this frame is a Wi-Fi configuration. The Wi-Fi configuration attribute may also include a two-octet length field, which may have a value that indicates the length of the remaining portions of the Wi-Fi configuration attribute. Next, the Wi-Fi configuration attribute may include a one-octet OP Code field. This OP Code field may have a value of 0 to correspond with setting an attribute, a value of 1 to correspond with getting an attribute, and a value of 2 to correspond with a response to one of the other two OP Code field types.

The Wi-Fi configuration attribute may also include a one-octet SSID Length field, which indicates the length of the SSID, from 1 to 32 octets. This may be followed by a variable length SSID Value field, which includes the SSID value. Next the Wi-Fi configuration attribute may also include a one-octet Security type field, followed by a variable length security credential field.

Table 7 is an example of values that might be used for the Security Type field shown in Table 6. That is, a value of 0 may indicate that a Wi-Fi network has no security, while values of 1, 2, and 3 may indicate WEP security, WPA-Personal or WPA2-Personal security, and WPA-Enterprise or WPA2-Enterprise security, respectively. Other values may be reserved for future use, such as possible future versions of Wi-Fi security, or for other purposes.

TABLE 7

| Security Type | Description |
|---|---|
| 0 | No Security |
| 1 | WEP |
| 2 | WPA-Personal or WPA2-Personal |
| 3 | WPA-Enterprise or WPA2-Enterprise |
| 4-255 | Reserved for future use |

The value of the security type field may also be used to ascertain which type of security credential field should be used. For example, when no security is present on a Wi-Fi network, the security type field may have a value of 0, and the security credentials field may be omitted. For Security Type of WEP (identified by a security type value of 1), the security credential may be defined as shown in Table 8.

TABLE 8

| Field | Size (Octets) | Value (Hex) | Description |
|---|---|---|---|
| Key Length | 1 | Variable | WEP key length |
| WEP Key | Variable | Variable | WEP key value |

In Table 8, the WEP key length may be provided in a one-octet Key Length field, while the WEP key value itself, used to access the WEP Wi-Fi network, may be provided in the WEP Key field. Similarly, for Security Type of WPA/2-Personal (identified by a security type value of 2), the security credential may be defined as shown in Table 9.

TABLE 9

| Field | Size (Octets) | Value (Hex) | Description |
|---|---|---|---|
| Passphrase Length | 1 | Variable | Passphrase length |
| Passphrase Key | Variable | Variable | Passphrase value |

In Table 9, a one-octet passphrase length field may indicate the length of the passphrase field, in octets. The passphrase key field may be the size indicated in the length field, and may contain the passphrase value that may be used to access the Wi-Fi network described by the Wi-Fi Configuration attribute.

A security credential may also be used for a security type of WPA/2-Enterprise, which may be identified when the security type field is set to a value of 3. This field may take a similar form to the other security credentials described in Tables 8 and 9, or may take another form that provides adequate information about the length of the security credential and adequate information to allow a receiving device to log into the described Wi-Fi network.

Referring back to Table 4, the attribute type in the ACS IE may also be an IP configuration attribute. Table 10 is an exemplary illustration of an adaptive configuration attribute for an IP configuration attribute. In this illustration, the attribute ID is 2, which indicates that the attribute is an IP (or LAN) configuration attribute.

TABLE 10

| Field | Size (Octets) | Value (Hex) | Description |
|---|---|---|---|
| Attribute ID | 1 | 2 | PI/LAN Configuration attribute |
| Length | 2 | Variable | Length of payload (length of the remaining fields of the attribute, in octets) |
| OP Code | 1 | 0-2 | 0 = Set; 1 = Get; 2 = Response |
| DHCP Setting | 1 | Variable | 0 = Disabled; 1 = Enabled |
| Network Address Descriptor | Variable | Variable | Applicable only if DHCP Setting is disabled (0) |

In Table 10, the IP configuration attribute may have a two-octet length field, which indicates the length of the remainder of the attribute, in octets. Next, the IP configuration attribute may include a one-octet OP Code field. This OP Code field may have a value of 0 to correspond with setting an attribute, a value of 1 to correspond with getting an attribute, and a value of 2 to correspond with a response to one of the other two OP Code field types. The IP configuration attribute may also have a one-octet DHCP setting field, which a value of 0 indicates that DHCP setting is disabled while a value of 1 indicates that DHCP setting is enabled. Finally, if DHCP setting is disabled, that is, the DHCP setting field has a value of 0, the IP configuration attribute has a network address descriptor with a variable length. In some aspects, the network address descriptor may take the form shown in Table 11.

TABLE 11

| Field | Size (Octets) | Value (Hex) | Description |
|---|---|---|---|
| Network Address Type | 1 | 0-1 | 0 = IPV4; 1 = IPV6 |
| IP Address | 4 or 6 | Variable | 4 octets for IPV4; |

TABLE 11-continued

| Field | Size (Octets) | Value (Hex) | Description |
|---|---|---|---|
| Subnet Mask | 4 or 6 | Variable | 6 octets for IPV6 4 octets for IPV4; 6 octets for IPV6 |
| Default Gateway | 4 or 6 | Variable | 4 octets for IPV4; 6 octets for IPV6 |
| DNS Server | 4 or 6 | Variable | 4 octets for IPV4; 6 octets for IPV6 |

As illustrated, the network access descriptor may include a one-octet network address type field. This field may be set to either 0, indicating that the network uses IPv4 (Internet Protocol version 4), or 1 indicating that the network uses IPv6 (Internet Protocol version 6). As illustrated, the network access descriptor may include a four- or six-octet IP address field. The number of octets needed for this field and the subsequent fields may depend on the version of IP protocol used, as IPv4 uses four-octet IP addresses, while IPv6 uses six-octet IP addresses. The network access descriptor may include a four- or six-octet subnet mask field, depending on the version of the IP that is used. The network access descriptor may include a four- or six-octet default gateway field, depending on the version of the IP that is used. The network access descriptor may include a four- or six-octet DNS server field, depending on the version of the IP that is used.

Figure 5:
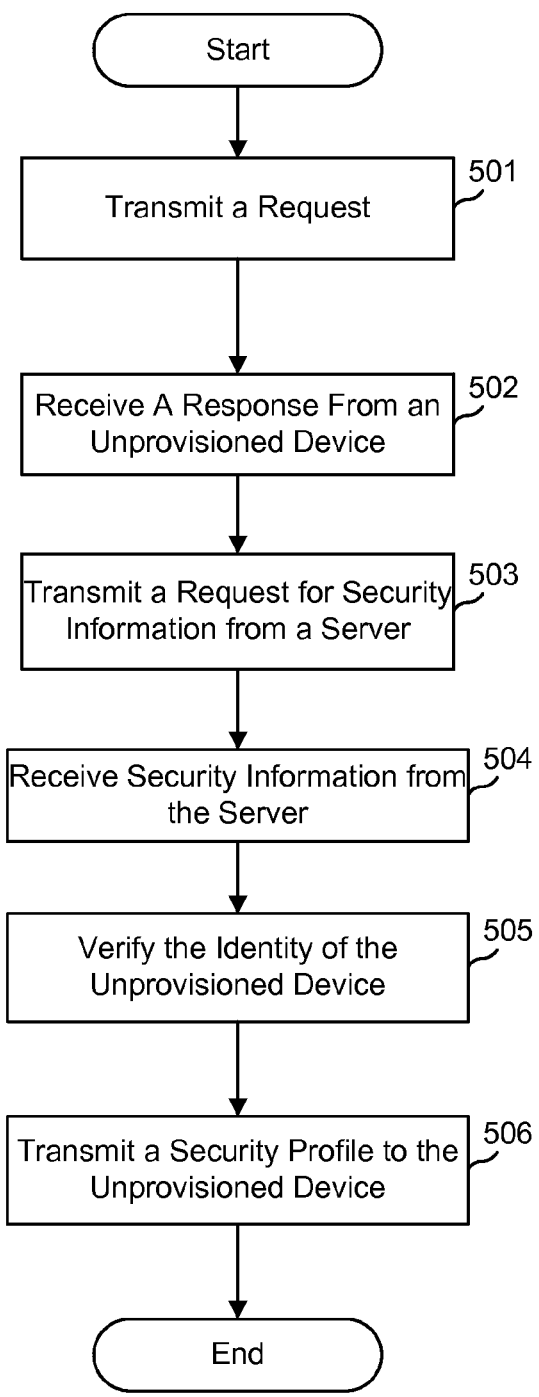
FIG. 5 is an exemplary illustration of a computer-implemented method for using a device to configure a second device to access a network.

FIG. 5 is an exemplary illustration of a computer-implemented method for using a device to configure a second device to access a network. This method may be performed by a device, such as by provisioned device D1 410, in FIG. 4, according to some aspects of the present disclosure.

At block 501, the device transmits a request. For example, the device may transmit a probe request on a channel. This request may be transmitted based on IEEE 802.11 protocols, such as being a Wi-Fi transmission. In some aspects, this request may contain an ACS IE, as described above, which may identify that the device is able to configure other devices to access a wireless communications network. For example, the ACS IE may have an OUI with a particular value, such as A0:02:DC and a particular OUI sub-type, such as a value of 1, which may be used to indicate that the device can configure other devices to access a wireless communications network. In some aspects, the request may also include a sequence number, which may prevent certain types of attacks and mitigate certain security concerns.

At block 502, the device receives a response from an unprovisioned device. In some aspects, this may include receiving a probe response on a channel, the probe response transmitted by the second device after the second device receives the probe request, the probe response containing information sufficient to inform the device that the probe response is in response to the probe request and the probe response including encrypted information.

At block 503, the device transmits a request for security information from a server. For example, the device may transmit a request for a piece of information, such as a secret key, that may be used to encrypt or decrypt communications with the unprovisioned device. In some aspects, the secret key may be known to the server and to the unprovisioned device. For example, an identifier of the unprovisioned device, such as its MAC address, may be associated with a particular secret key. Thus, the device may transmit the MAC address of the unprovisioned device to the server, in order to receive the secret key for the device associated with that MAC address.

At block 504, the device receives security information from the server. As described above, the security information may include a key, such as a secret key. This key may be known to the unprovisioned device and to the server, and may be associated with an identifier of the unprovisioned device, such as its MAC address. In some aspects, the server may be located in the cloud, such as on the Internet. For example, the device may communicate with the server through the access point and the wireless communication network, in order to query a server in the cloud and receive a response from that query.

At block 505, the device verifies the identity of the unprovisioned device. For example, this may be done by confirming that the unprovisioned device has a MAC address that is known to the server. This might be as simple as checking the server's response for an indication of whether that MAC address is a participating MAC address, e.g., that the server supports and/or acknowledges that particular MAC address, and by extension, that particular unprovisioned device. In some aspects, this may include having the device decrypt encrypted information from the probe response, based at least in part on security information received from the server.

At block 506, the device transmits a security profile to the unprovisioned device. In some aspects, a portion of the security profile may be encrypted by the device. For example, the device may be configured to encrypt a security profile of an access point to the network, the security profile containing information sufficient to allow the second device to connect to the access point to access the network. This encryption may be based, at least in part, on the security information from the server. The device may then transmit the decrypted information and the encrypted security profile to the second device. In some aspects, encrypting the security profile includes encrypting the security profile based at least in part on an identifier of the device, an identifier of the second device, the security information, and the information sufficient to inform the device that the probe response is in response to the probe request.

In some aspects, the security profile may include information on a wireless communication network, such as a Wi-Fi network. For example, this information may include information sufficient to allow the unprovisioned device to access the Wi-Fi network, in order to gain access to a WAN, such as the Internet. This information may be encrypted during this transmission, in order to prevent other devices from accessing the Wi-Fi network without authentication of those devices.

In some aspects, the security profile may include or be transmitted with an encrypted challenge text. For example, the unprovisioned device may be configured to include an encrypted challenge text. The challenge test may initially be randomly generated, but stored on the unprovisioned device such that the unprovisioned device will be able to compare the generated challenge text to later decrypted challenge text. The challenge text may be encrypted based at least in part on the secret key. For example, this encryption may be based on a secret key, the MAC address of the unprovisioned device, and a sequence number. The device may be configured to decrypt this challenge text, after receiving the secret key. The device may be further configured to encrypt the challenge text based upon on a secret key, the MAC address of the unprovisioned device, the MAC address of the device, and a sequence number. This re-encrypted challenge text may then be transmitted to the unprovisioned device. This may then be decrypted by the unprovisioned device, in order to allow the unprovisioned device to authenticate the identification of the device.

Figure 6:
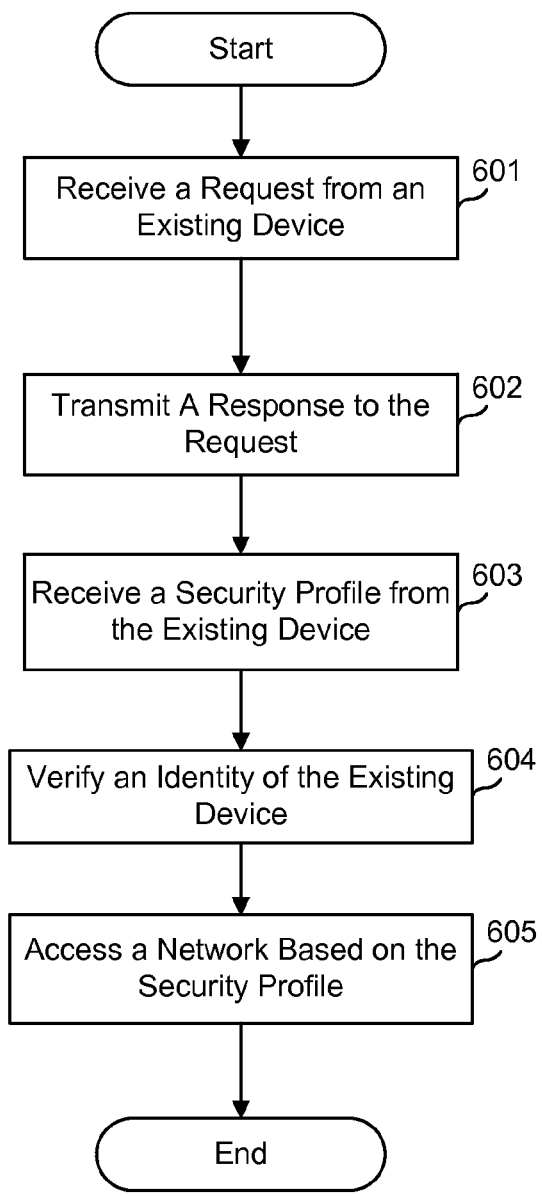
FIG. 6 is an exemplary illustration of a computer-implemented method for a device to be configured, by a provisioned device, to access a network.

FIG. 6 is an exemplary illustration of a computer-implemented method for a device to be configured, by a provisioned device, to access a network. This method may be performed by a device, such as by unprovisioned device D2 415, in FIG. 4, according to some aspects of the present disclosure.

At block 601, the device receives a request from a provisioned device. For example, the provisioned device may transmit a probe request on a channel. The provisioned device may be in a discovering state, as described above. In some aspects, the request may contain information sufficient to inform the device that the provisioned device can configure the device to access a network through an access point. In some aspects, the network may include a wireless communication network that may operate, for example, according to one of the IEEE 802.11 protocols as a Wi-Fi network.

At block 602, the device transmits a response to the request. The response may take the form of a probe response frame. The response may be transmitted on the same channel as the request. The response may be transmitted to the provisioned device, and may include information sufficient to identify the received request. In some aspects, the response may also include an encrypted challenge text. The encryption used of the challenge text may be based upon a secret key that is known to the device and to a server. The encryption may also be based on a sequence number, and based on an identifier, such as a MAC address, of the device. The encrypted challenge text may be configured to be decrypted by the provisioned device based upon the security key, which may be known to a server.

At block 603, the device receives a security profile from the provisioned device. The security profile may contain information sufficient to access the network through the access point. In some aspects, the security profile may also include the challenge text, which may be encrypted. As described above, the challenge text may be decrypted by the provisioned device, and then re-encrypted (using a different encryption) by the provisioned device. Other portions of the security profile may also be encrypted, using similar encryption to that used in the re-encrypted challenge text. For example, portions of the security profile that contain log-in information for a wireless communication network may be encrypted, so that unauthorized devices cannot use this login information. In some aspects, the security profile may be transmitted using an action frame. The security profile may be transmitted according to one or more IEEE 802.11 protocol.

At block 604, the device verifies an identity of the provisioned device. For example, this may be done by decrypting the challenge text described above, and comparing the decrypted challenge text to the original challenge text. This may verify that the provisioned device was able to obtain the secret key from the server. For example, in order to decrypt this challenge text, the device may generate a second encryption key based at least on the secret key, decrypt the portion of the security profile that corresponds to the challenge text, and verify the identity of the device by comparing the challenge text to the decrypted challenge text. In some aspects, the second encryption key may be based on the sequence number, the secret key, and the MAC addresses of both the provisioned device and the device.

At block 605, the device accesses a network based on the security profile. For example, this network may be an IEEE 802.11 network, and the security profile may contain information on how to gain access to this network, such as containing a password and other information about the network. In some aspects, this security profile information may be encrypted, such as using the same encryption as the re-encrypted challenge text. Accordingly, the device may be configured to decrypt the security profile information that is needed to gain access to the wireless communication network.

Figure 7:
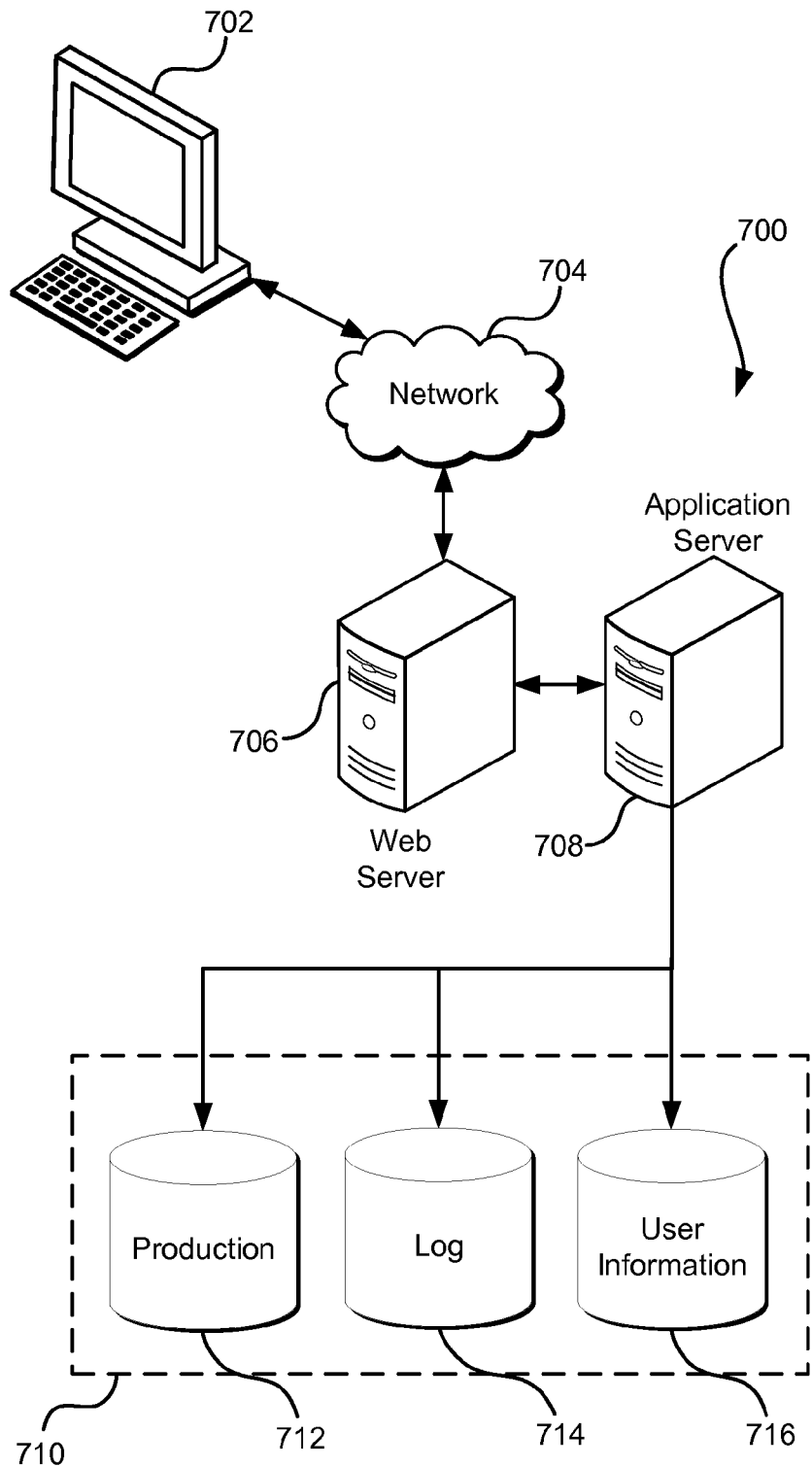
FIG. 7 illustrates an environment in which various embodiments can be implemented.

FIG. 7 illustrates aspects of a system 700 for implementing aspects in accordance with various embodiments. As will be appreciated, although a web-based environment is used for purposes of explanation, different environments may be used, as appropriate, to implement various embodiments. The environment includes a client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium that can be used to store the desired information and that can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory computer-readable storage medium.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for using a first device to configure a second device to access a network, comprising:
   transmitting, by the first device, a first packet on a channel using an associated first media access control address, wherein the first packet comprises a probe request including a service set identifier information element that includes a setup value, wherein the setup value is a value that signals to the second device that the first device is able to configure the second device to access the network;
   receiving, by the first device, a second packet on the channel from the second device, wherein the second packet comprises a probe response containing a first encrypted challenge text and a sequence number and wherein the second packet includes a second media access control address;
   extracting, by the first device, from the second packet the second media access control address of the second device;
   transmitting, by the first device, a request for security information to a server, wherein the request includes the second media access control address and wherein the security information is security information associated with the second device;
   receiving, by the first device, the security information from the server;
   deriving, by the first device, a first encryption key using the first media access control address, the security information received from the server, and the sequence number;
   decrypting, by the first device, the first encrypted challenge text received from the second device into a first decrypted challenge text, wherein the decrypting uses the first encryption key;
   generating a second encryption key using the first media access control address, the second media access control address, the security information received from the server, and the sequence number;
   generating an encrypted security profile, using the second encryption key, from a security profile of an access point of the network, wherein the security profile includes attributes for the second device to use to connect to the network via the access point; and
   transmitting to the second device, by the first device, a third packet on the channel, the third packet comprising the encrypted security profile, wherein the encrypted security profile enables the second device to access the network.

2. The computer-implemented method of claim 1, further comprising:
   receiving, by the second device, the third packet;
   generating, by the second device, a copy of the second encryption key from the first media access control address, the second media access control address, a copy of the security information stored in the second device, and the sequence number;
   decrypting, by the second device, the encrypted security profile using the copy of the second encryption key to form a decrypted security profile; and
   using, by the second device, the decrypted security profile to connect to the access point to access the network.

3. The computer-implemented method of claim 2, wherein using the decrypted security profile to connect to the access point to access the network comprises:
   extracting, by the second device, a Wi-Fi configuration attribute from the decrypted security profile;
   extracting, by the second device, a security type from the Wi-Fi configuration attribute;
   extracting, by the second device, security credentials from the Wi-Fi configuration attribute; and
   associating, by the second device, with the access point using the security type and the security credentials.

4. The computer-implemented method of claim 1, further comprising:
   encrypting, by the first device, a set of attributes with the second encryption key to form an encrypted set of attributes, wherein the set of attributes includes the first decrypted challenge text;
   inserting, by the first device, the encrypted set of attributes into the third packet prior to transmission to the second device;
   decrypting, by the second device, the encrypted set of attributes to obtain a copy of the first decrypted challenge text; and
   comparing, by the second device, the first decrypted challenge text with a challenge text that was encrypted to form the first encrypted challenge text.

5. A system, comprising:
   a transmitter and a receiver;
   a processor configured to:
      transmit a first request on a channel, the first request including a service set identifier information element with a setup value and an identifier of the system, wherein the setup value is a value that signals to an unprovisioned device that the system is able to configure the unprovisioned device to enable the unprovisioned device to access a network through an access point;

receive a response on the channel from the unprovisioned device, the response requesting that the system configure the unprovisioned device to access the network through the access point wherein the response includes a sequence number and a first encrypted challenge text encrypted by a first secret value stored in the unprovisioned device;

transmit a second request for security information of the unprovisioned device to a server;

receive the security information from the server, wherein the security information corresponds to the first secret value stored in the unprovisioned device;

generate a copy of the first secret value available outside the unprovisioned device, using an identifier of the unprovisioned device, the security information received from the server, and the sequence number;

use the security information to verify an identity of the unprovisioned device;

generate a security profile encrypted using a second secret value, wherein the second secret value is based on the copy of the first secret value and the identifier of the system, and wherein the security profile includes attributes for the unprovisioned device to connect to the network via the access point; and transmit the security profile to the unprovisioned device.

6. The system of claim 5, wherein the first request further includes a vendor-specific information element with a vendor-specific organizationally unique identifier, wherein the first encrypted challenge text is encrypted using an encryption key, the encryption key based at least in part on the first secret value, and wherein to verify the identity of the unprovisioned device, the processor is further configured to decrypt the first encrypted challenge text using the security information.

7. The system of claim 6, wherein to decrypt the first encrypted challenge text using the security information, the processor is further configured to:

derive the encryption key as a function of the copy of the first secret value; and decrypt the first encrypted challenge text using the encryption key.

8. The system of claim 5, wherein the first secret value is a function of (a) a medium access control address used by the unprovisioned device for other network interactions, (b) the first secret value stored in the unprovisioned device, and (c) the sequence number.

9. The system of claim 5, wherein the second request for the security information is a request for the server to send the first secret value, wherein the second request includes the identifier of the unprovisioned device, the identifier of the unprovisioned device including one of a medium access control address used by the unprovisioned device for other network interactions, a serial number of the unprovisioned device, a model number of the unprovisioned device, or another number that uniquely identifies the unprovisioned device.

10. The system of claim 5, wherein to use the security information to verify the identity of the unprovisioned device, the processor is further configured to:

authenticate the identity of the unprovisioned device based on the security information received from the server, the security information confirming that the identifier of the unprovisioned device is associated with the security information; and use the security information to decrypt the first encrypted challenge text received from the unprovisioned device.

11. The system of claim 5, wherein the processor is further configured to:

generate the second secret value based on the identifier of the unprovisioned device, the identifier of the system, the security information received from the server, and the sequence number; and encrypt the security profile using the second secret value, the security profile including at least security credentials that may be used to access a wireless network provided by the access point.

12. The system of claim 5, wherein the processor is further configured to:

store previously received sequence numbers; and compare the sequence number included in the response to the previously received sequence numbers.

13. A non-transitory computer-readable storage medium having stored thereon executable instructions that, when executed by one or more processors of a computer system, cause the computer system to at least:

receive a first request from a provisioned device on a channel, the request including a service set identifier information element with a setup value and an identifier of the provisioned device, wherein the setup value is a value that signals that the provisioned device can configure the computer system to be provisioned to access a network through an access point;

generate a first secret value based at least on a secret key that is known to a server, an identifier of the computer system, and a sequence number;

transmit a response to the provisioned device, the response requesting that the provisioned device configure the computer system to provide the access to the network through the access point, wherein the response includes a sequence number, a first encrypted challenge text encrypted by the first secret value, and the identifier of the provisioned device;

generate a second secret value based at least on the first secret value and the identifier of the provisioned device;

receive a security profile from the provisioned device, wherein the security profile includes data usable to allow the computer system to connect to the access point to access the network and wherein the security profile is encrypted using the second secret value;

verify an identity of the provisioned device using the security profile; and access the network through the access point using the security profile.

14. The non-transitory computer-readable storage medium of claim 13, wherein the identifier of the computer system comprises one of a medium access control address used by the computer system, a serial number of the computer system, a model number of the computer system, or another number that uniquely identifies the computer system, and wherein the instructions that cause the computer system to transmit a response to the provisioned device further cause the computer system to:

encrypt an original challenge text with the first secret value to form the first encrypted challenge text.

15. The non-transitory computer-readable storage medium of claim 14, wherein the security profile includes a second encrypted challenge text, and wherein the instructions that cause the computer system to verify an identity of the provisioned device cause the computer system to:
- decrypt the second encrypted challenge text using the second encryption key secret value to form a decrypted challenge text; and
- verify the identity of the provisioned device by comparing the decrypted challenge text and the original challenge text.

16. The non-transitory computer-readable storage medium of claim 15, wherein the identifier of the computer system includes the medium access control address used by the computer system, the identifier of the provisioned device includes a second medium access control address used by the provisioned device, and the first request further includes a vendor-specific information element with a vendor-specific organizationally unique identifier.

17. The non-transitory computer-readable storage medium of claim 13, wherein at least a portion of the data usable to allow the computer system to connect to the access point to access the network is an encrypted portion, and wherein the instructions that cause the computer system to access the network through the access point cause the computer system to:
- decrypt at least a portion of the encrypted portion using the second secret value to form a decrypted portion; and
- access the network through the access point using the decrypted portion.

18. The non-transitory computer-readable storage medium of claim 13, wherein the security profile includes a Wi-Fi configuration attribute, and wherein the security profile is at least partly encrypted.

19. The non-transitory computer-readable storage medium of claim 18, wherein the instructions that cause the computer system to access the network through the access point cause the computer system to:
- extract the Wi-Fi configuration attribute from the security profile;
- extract a security type from the Wi-Fi configuration attribute;
- extract security credentials from the Wi-Fi configuration attribute; and
- associate with the access point using the security type and the security credentials.

20. The non-transitory computer-readable storage medium of claim 13, wherein the instructions that cause the computer system to access the network through the access point cause the computer system to:
- store a previously used sequence number; and
- use, in the response, a unique sequence number distinct from the previously used sequence number.

* * * * *